United States Patent [19]

Johnson

[11] Patent Number: 5,477,321
[45] Date of Patent: Dec. 19, 1995

[54] DUAL BEAM TUNABLE SPECTROMETER

[75] Inventor: Rick J. Johnson, Elkhart, Ind.

[73] Assignee: Bayer Corporation, Elkhart, Ind.

[21] Appl. No.: 298,613

[22] Filed: Aug. 31, 1994

[51] Int. Cl.$^6$ ........................................... G01J 3/42
[52] U.S. Cl. ................ 356/319; 356/325; 356/327; 356/369; 356/446; 356/447; 250/339.07; 250/339.11
[58] Field of Search ................... 356/308, 309, 356/369, 319, 323, 325, 326, 327, 328, 446–448; 250/339.07, 339.11, 339.13, 338.5

[56] References Cited

U.S. PATENT DOCUMENTS

| | | | |
|---|---|---|---|
| 4,883,963 | 11/1989 | Kemeny et al. | 356/308 |
| 4,890,926 | 1/1990 | Dosmann et al. | 356/369 |
| 5,039,855 | 8/1991 | Kemeny et al. | 356/437 |
| 5,198,875 | 3/1993 | Bazin et al. | 356/369 |

OTHER PUBLICATIONS

Tran, Chieu D., "Optical Elements for Spectroscopy," *Analytical Chemistry*, vol. 64, No. 20, pp. 971–981, Oct. 15, 1992.

Primary Examiner—F. L. Evans
Attorney, Agent, or Firm—Jerome L. Jeffers

[57] ABSTRACT

A dual beam tunable spectrometer comprises a radiation source, generating means, a detector, and a shutter arrangement. The radiation source generates an incident radiative beam. The generating means, which includes an acousto-optic tunable filter, receives the incident radiative beam and generates therefrom a reference beam and a sample beam. The detector detects at least part of the reference beam, and detects at least part of the sample beam emitted from a sample following illumination of the sample with the sample beam. The shutter arrangement includes a first shutter selectively permitting passage therethrough of the part of the reference beam and a second shutter selectively permitting passage therethrough of the part of the sample beam. The shutter arrangement opens the first shutter and closes the second shutter to permit the detector to detect only the part of the reference beam. Similarly, the shutter arrangement closes the first shutter and opens the second shutter to permit the detector to detect only the part of the sample beam.

26 Claims, 3 Drawing Sheets

DUAL BEAM TUNABLE SPECTROMETER

BACKGROUND OF THE INVENTION

Optical spectrometers are utilized to quantitatively measure the concentration of a variety of analytes. Optical spectrometers utilize that portion of the spectrum commonly known as ultraviolet, visible, and infrared radiation. There are two types of commonly used spectrometers: reflectance spectrometers and transmittance spectrometers.

Reflectance spectrometers measure the concentration of an analyte when a sample absorbs and scatters portions of a sample beam. The portion of a sample beam that is not absorbed or transmitted is reflected from the sample into a detector and measured. The difference between the reflected sample beam and a reference beam quantitatively indicates the concentration of the analyte in the sample.

Similarly, transmittance spectrometers measure the concentration of an analyte when a sample absorbs a portion of a sample beam. However, the sample does not reflect the sample beam into a detector. Rather, a portion of the sample beam is absorbed as it travels through the sample. The difference between the transmitted sample beam and a reference beam quantitatively indicates the concentration of the analyte in the sample.

Spectrometers typically employ a radiation source that produces radiation with a wide frequency distribution. Tungsten filament lamps or deuterium lamps are commonly used radiation sources that produce ultraviolet (UV), visible and some infrared radiation (IR). A desired wavelength is selected through the use of filters, diffraction gratings, prisms, acousto-optic tunable filters and other means.

An acousto-optic tunable filter (AOTF) diffracts light through a sound-light interaction. This phenomenon is described by Professor Chieu D. Tran in *Anal. Chem.*, 64:20, 971–981 (1992), incorporated herein by reference. Briefly, an AOTF is a transparent medium (e.g. quartz, tellurium dioxide ($TeO_2$)) in which an acoustic wave can be propagated. The index of refraction of the transparent medium is perturbed by the acoustic wave as it propagates through the medium. The perturbation in the index of refraction arises from compression and rarefaction of the transparent material caused by the traveling acoustic wave. As an incident light beam passes through the transparent medium, the propagating acoustic wave produces a moving grating that diffracts portions of the incident light beam. An AOTF can be constructed such that only the first-order Bragg diffraction is observed. When only the first-order Bragg diffraction pattern is observed, two first-order beams with relative orthogonal polarizations are produced. Typically, the acoustic wave is transduced in the transparent medium by applying a radio frequency (RF) signal in the megahertz region to a piezoelectric transducer attached to the crystalline transparent medium. The use of an acousto-optic tunable filter (AOTF) to diffract a wide frequency light source to a desired frequency is advantageous in that the desired frequency can be obtained almost instantaneously, on the order of microseconds, by tuning the AOTF with a proper RF signal.

Spectrometers which utilize an acousto-optic tunable filter are known. U.S. Pat. No. 5,039,855 to Kemeny et at. describes a dual beam transmittance spectrometer which utilizes an acousto-optic tunable filter. Kemeny isolates two radiation beams from an AOTF and utilizes one beam as a reference beam and a second beam to analyze a sample (sample beam). Kemeny employs one detector to measure the reference beam and a second detector to measure the sample beam. To obtain accurate readings in spectrometers that use two detectors, the detectors must be matched because the difference between the sample beam and the reference beam measures the analyte of interest. There is a need for a dual beam transmittance spectrometer with one detector capable of measuring both a reference beam and a sample beam.

Reflectance spectrometers are known and are available commercially. Typically, in a reflectance spectrometer, a sample is illuminated at one angle relative to the sample and the reflectance is detected at a second angle relative to the sample. This configuration is preferably designed to reject specular and surface reflections from the sample so as to minimize the amount of noise reaching the detector and enhance the sensitivity of the spectrometer. Reflectance spectrometers available today are not capable of illuminating a sample at a ninety degree angle relative to the sample and detecting the reflectance from the sample at the same ninety degree angle relative to the sample. Thus, there is a need for a reflectance spectrometer capable of illuminating the sample and detecting the reflectance from the sample at the same angle (ninety degrees) relative to the sample and, at the same time, capable of minimizing the amount of specular and surface reflections reaching the detector. In addition, there is a need for a reflectance spectrometer that utilizes one or both of the orthogonally-polarized first-order beams from an AOTF.

SUMMARY OF THE INVENTION

In one particular embodiment, the present invention provides a dual beam tunable spectrometer comprising a radiation source, generating means, a detector, and a shutter arrangement. The radiation source generates an incident radiative beam. The generating means, which includes an acousto-optic tunable filter, receives the incident radiative beam and generates therefrom a reference beam and a sample beam. The detector detects at least part of the reference beam, and detects at least part of the sample beam emitted from a sample following illumination of the sample with the sample beam. The shutter arrangement includes a first shutter selectively permitting passage therethrough of the part of the reference beam and a second shutter selectively permitting passage therethrough of the part of the sample beam. The shutter arrangement opens the first shutter and closes the second shutter to permit the detector to detect only the part of the reference beam. Similarly, the shutter arrangement closes the first shutter and opens the second shutter to permit the detector to detect only the part of the sample beam.

Figure 1:
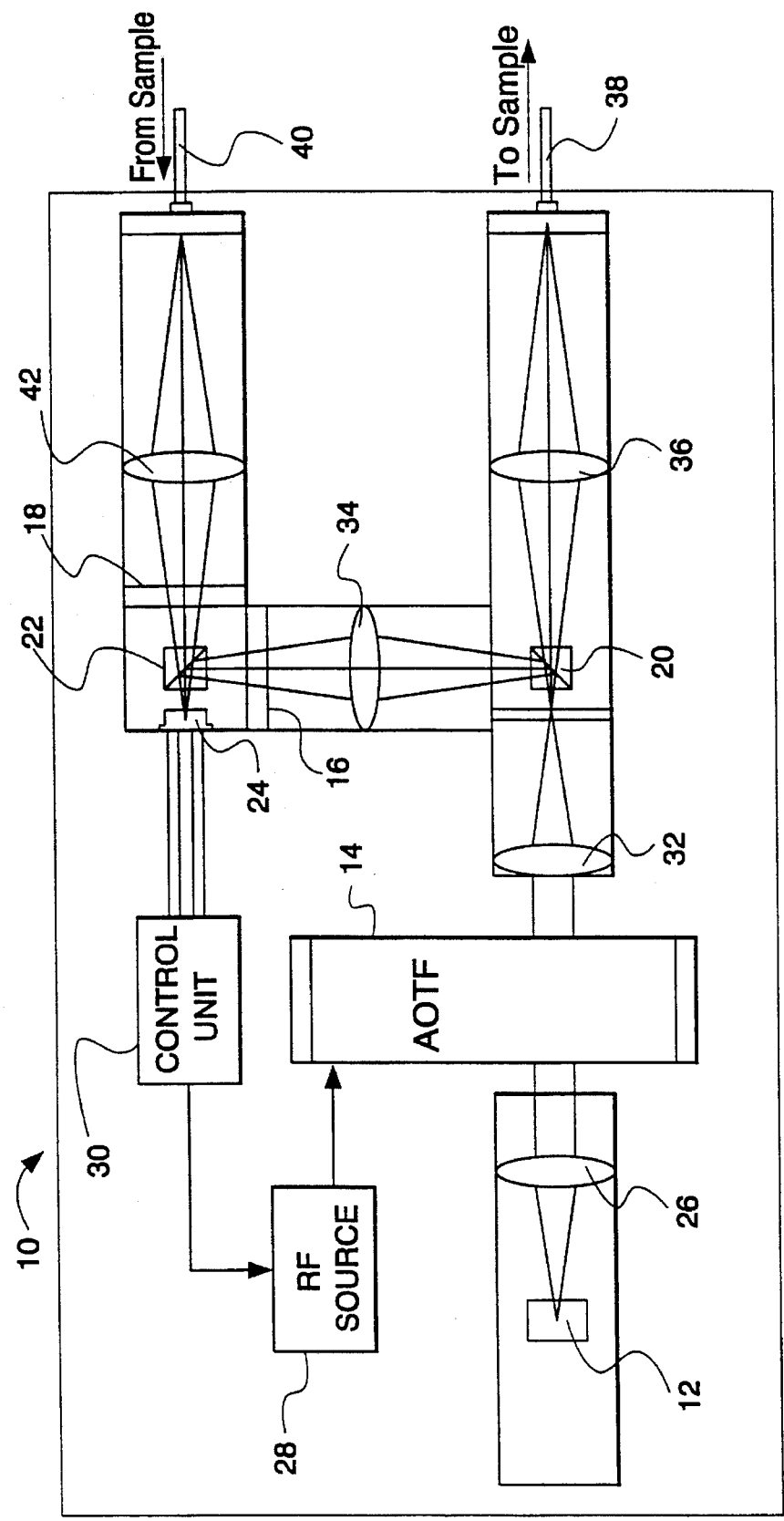
FIG. 1 is a schematic diagram of a dual beam tunable spectrometer, in accordance with the present invention, capable of taking either transmission or reflection measurements.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, FIG. 1 illustrates a dual beam tunable spectrometer 10 capable to taking either transmission measurements through a sample or reflection measurements from the sample. The spectrometer 10 includes an artificial radiation source 12, an acousto-optic tunable filter (AOTF) 14, a shutter system having a pair of mechanical or electro-optic shutters 16, 18, a pair of beam splitter cubes 20, 22, and a detector 24. The foregoing elements of the spectrometer 10 are described in detail below in conjunction with the description of the operation of the spectrometer 10.

The artificial radiation source 12 preferably emits controlled radiation having a broad spectral output. Examples of artificial radiation sources meeting these criteria include deuterium discharge tubes, incandescent lamps (e.g., tungsten filament), halogen lamps, fluorescent lamps, and lasers. To collimate the radiation emitted from the radiation source 12, a collimating lens 26 or other suitable collimating device is mounted adjacent the radiation source 12. To most effectively focus the radiation from the radiation source 12 into a parallel beam, the radiation source 12 is positioned near the principal focus (focal point) of the collimating lens 26. The collimating lens 26 is commercially available as part no. 01 LPX 017 from Melles Griot of Irvine, Calif.

In response to a radio frequency (RF) tuning signal from an RF source 28, the AOTF 14 diffracts the incident collimated radiative beam to a desired wavelength in the light spectrum. A control unit 30 controls the frequency of the RF signal emitted from the RF source 28. The optical output from the AOTF 14 includes a zero-order beam and a pair of orthogonally-polarized first-order beams. The wavelength of the first-order beams is inversely proportional to the wavelength of the RF tuning signal. Thus, the longer the wavelength of the RF tuning signal, the shorter the wavelength of the first-order beams. The RF tuning signal may be varied such that the first-order beams have a wavelength falling within the ultraviolet, visible, or infrared spectrum. The AOTF 14 is commercially available as part no. TEAF-0.08–1.65 from Brimrose Corporation of Baltimore, Md.

One of the first-order beams emitted from the AOTF 14 is focused by a converging lens 32 onto the beam splitter cube 20. The zero-order beam and the other first-order beam are absorbed by respective radiation absorbers or beam stops (not shown). As viewed in FIG. 1, the angled face of the splitter cube 20 reflects a first portion ("reference portion") of the AOTF first-order beam upward toward the shutter 16 and transmits a second portion ("sample portion") of the AOTF first-order beam toward a sample. The reference portion preferably constitutes approximately 5 to 10 percent of the AOTF first-order beam, while the sample portion constitutes the remainder of the AOTF first-order beam. Alternatively, the beam splitter cube 20 may be configured so that the reference portion constitutes up to 50 percent of the AOTF first-order beam and the sample constitutes the remainder of the AOTF first-order beam. By controlling the pair of shutters 16, 18 so that only one of these shutters is open at a given time, the detector 24 separately takes reference and sample measurements. The shutters 16, 18 are each commercially available as part no. VS14SITOK from Vincent Associates of Rochester, N.Y.

To take reference measurements, the shutter system opens the shutter 16 and closes the shutter 18. The reference portion reflected from the beam splitter cube 20 is focused by a converging lens 34 onto the second beam splitter cube 22. If the lens 34 is symmetrical about a horizontal plane passing through the center of the lens 34 (as viewed in FIG. 1), the lens 34 is located approximately half-way between the splitter cube 20 and the splitter cube 22. Since the shutter 16 is open and the shutter 18 is closed, the only radiation impinging on the splitter cube 22 is the reference portion of the AOTF first-order beam. The angled face of the splitter cube 22 reflects approximately 5 to 10 percent of the reference portion toward the detector 24 and transmits the remainder of the reference portion to a radiation absorber (not shown). The splitter cube 22, as well as the splitter cube 20, are commercially available from CVI Laser Corporation of Albuquerque, N. Mex.

The detector 24 detects the reflected part of the reference portion. In the preferred embodiment, the detector 24 is an InGaAs (indium-gallium-arsenide) detector focusing on the infrared spectrum and having a built-in amplifier to minimize noise interference. Such a detector is commercially available as part no. SD 6085 from Advanced Photonics of Camarillo, Calif. Other suitable detectors include photomultiplier tubes, charge-couple devices, diode-array detectors, and germanium detectors. The control unit 30, which is communicatively coupled to the detector 24, measures the amount of radiation detected by the detector 24. For typical reference readings, the shutter 16 remains open and the shutter 18 remains closed for a few seconds or less.

To take sample measurements, the shutter system simultaneously closes the shutter 16 and opens the shutter 18. In this case, the closed shutter 16 prevents any of the reference portion of the AOTF first-order beam from reaching the detector 24. The sample portion of the AOTF first-order beam (i.e., the portion of the AOTF first-order beam transmitted straight through the beam splitter cube 20) is focused by a converging lens 36 into an optical fiber 38. To maximize the amount of sample portion radiation received by the optical fiber 38, the input end of the optical fiber 38 is preferably located at or near the focus of the lens 36. If the lens 36 is symmetrical about a vertical plane passing through the center of the lens 36 (as viewed in FIG. 1), the lens 36 is located approximately half-way between the detector 22 and the input end of the optical fiber 38.

The optical fiber 38 transmits the sample portion of the AOTF radiative first-order beam toward a sample, while a second optical fiber 40 receives radiation from the sample. The optical fibers 38, 40 are mounted in respective housings (not shown) to provide them with support. The manner in which the optical fiber 40 receives radiation from the sample depends on whether the spectrometer 10 is configured for reflection or transmission measurements. For transmittance readings, the sample is interposed between the output end of the optical fiber 38 and the input end of the optical fiber 40. The optical fiber 38 directs the sample portion of the AOTF first-order beam toward the sample, and the optical fiber 40 receives on the opposite side of the sample that portion of the radiative beam which is transmitted through the sample to the input end of the optical fiber 40.

For reflectance readings, the output end of the optical fiber 38 and the input end of the optical fiber 40 are located on the same side of the sample. In the preferred embodiment, the optical fiber 38 emits a radiative beam at a ninety degree angle relative to the sample and the optical fiber 40 receives the radiation reflected from the sample at a scattering angle of 45 degrees relative to the sample. Such a configuration for reflectance readings is illustrated in U.S. Pat. No. 4,890,926 to Dosmann et at. The scattering angle is measured between a line representing the direction of travel of the incoming radiation from the optical fiber 38 to the sample and a line representing the direction of travel of the reflected radiation from the sample to the optical fiber 40. While other scattering angles may be used, it is well-known in the an that a scattering angle of 45 degrees is most efficient.

For both transmittance and reflectance arrangements, the radiation received by the optical fiber 40 from the sample is emitted from the optical fiber 40 toward the beam splitter cube 22. Since the emitted radiation tends to diverge, a converging lens 42 is positioned between the splitter cube 22 and the optical fiber 40 to focus the radiation onto the detector 20 via the splitter cube 22. As previously stated, the shutter 18 is open to allow the radiation to pass therethrough. The splitter cube 22 and the output end of the optical fiber 40 are disposed in line with each other on opposite sides of the lens 42. Moreover, since the lens 42 is symmetrical about a vertical plane passing through the center of the lens 42 (as viewed in FIG. 1), the lens 42 is located approximately half-way between the detector 20 and the output end of the optical fiber 40.

The splitter cube 22 transmits approximately 90 to 95 percent of the radiation from the sample toward the detector 24, and reflects the remainder of the radiation upward toward the radiation absorber (not shown). The amount of detected radiation is measured by the control unit 30, which compares the detected radiation from the sample with the previously measured reference value to quantitatively determine the concentration of a targeted analyte in the sample. The wavelength of the AOTF first-order beam is determined by the analyte in the sample being targeted. In particular, the RF tuning signal from the RF source 28 is selected so as to diffract a radiative beam incident on the AOTF 14 to wavelength(s) encompassing the absorption wavelength(s) of the targeted analyte.

It can be seen from the foregoing description that the spectrometer 10 is capable of making both transmittance and reflectance measurements using only one first-order beam from the AOTF 14. The beam splitter cube 20 splits this first-order beam into both the reference beam and the sample beam. Furthermore, the spectrometer 10 employs on the single detector 24 for detecting both the reference beam and the sample beam. The shutters 16, 18 are controlled so that only one of these two beams reaches the detector 24 at any given time.

Figure 2:
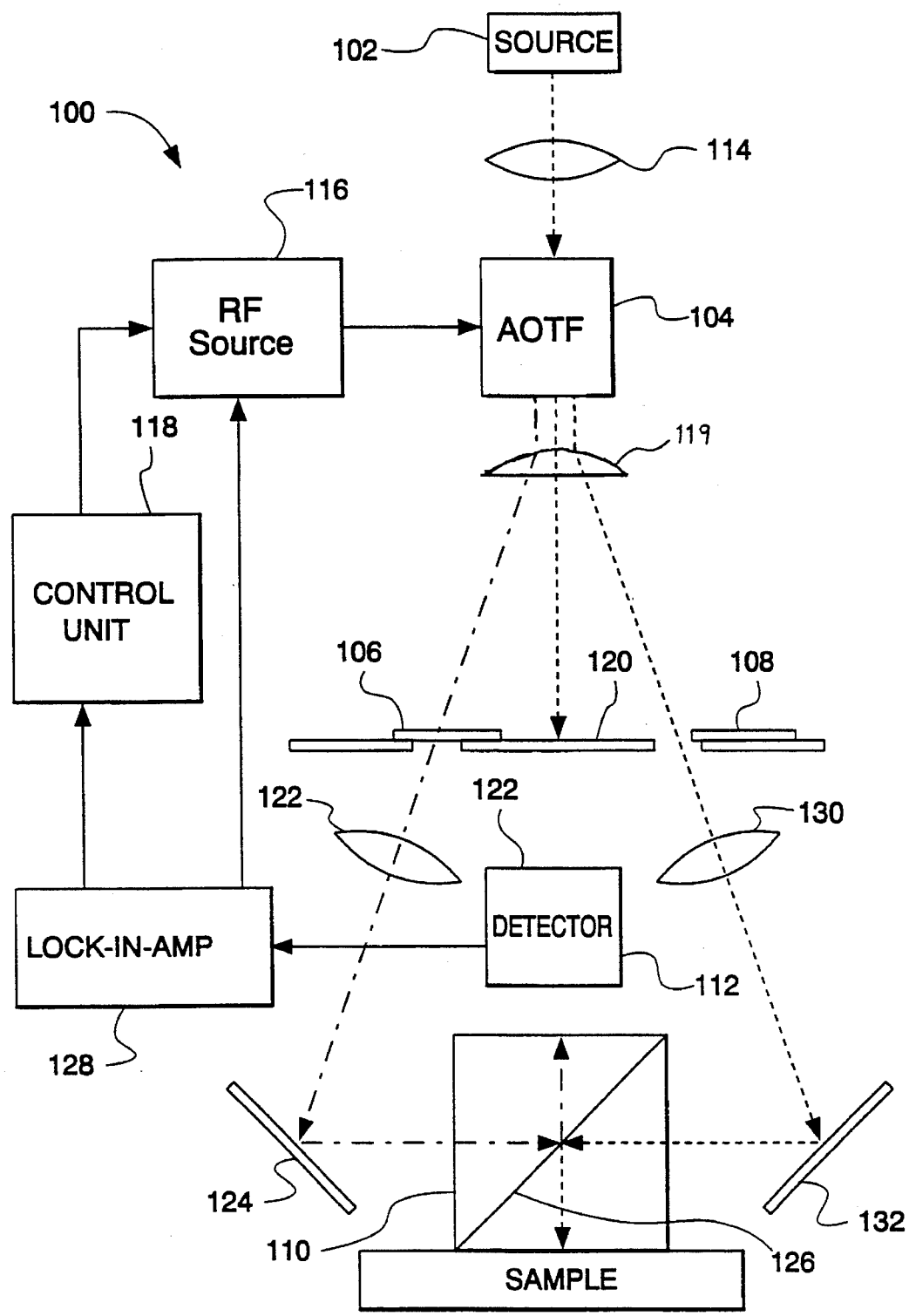
FIG. 2 is a schematic diagram of an alternative dual beam tunable spectrometer, in accordance with the present invention, capable of taking reflection measurements.

FIG. 2 illustrates an alternative spectrometer 100, in accordance with the present invention, capable of taking reflectance readings. This reflectance spectrometer 100 includes an artificial radiation source 102, an acousto-optic tunable filter (AOTF) 104, a shutter system having a pair of mechanical or electro-optic shutters 106, 108, a polarizing beam splitter cube 110, and a detector 112. The foregoing elements of the spectrometer 100 are described in detail below in conjunction with the description of the operation of the spectrometer 100.

The radiation source 102 emits controlled radiation having a wide frequency distribution toward the AOTF 104. Suitable radiation sources include deuterium discharge tubes, incandescent lamps (e.g., tungsten filament), halogen lamps, fluorescent lamps, and lasers. A collimating lens 114 or other suitable collimating device is situated between the radiation source 102 and the AOTF 104 so as to collimate the radiation prior to reaching the AOTF 104. To most effectively focus the radiation from the radiation source 102 into a parallel beam, the radiation source 102 is positioned near the principal focus (focal point) of the collimating lens 114. Like the collimating lens 26 in FIG. 1, the collimating lens 114 is commercially available as part no. 01 LPX 017 from Melles Griot of Irvine, Calif.

When the collimated radiative beam passes through the AOTF 104, the AOTF 104 process the radiative beam into a zero-order beam and a pair of orthogonally-polarized first-order beams. An RF tuning signal from the RF source 116 controls the wavelength of the first-order beams, and the frequency of the RF tuning signal is, in turn, controlled by the control unit 118. The RF tuning signal may be varied such that the pair of first-order beams from the AOTF 104 have a wavelength falling within the ultraviolet, visible, or infrared spectrum. The RF signal is selected so that the first-order beams from the AOTF 104 have a wavelength(s) encompassing the absorption wavelength(s) of the targeted analyte in the sample. Like the AOTF 14 in FIG. 1, the AOTF 104 is commercially available as part no. TEAF-0.80–1.65 from Brimrose Corporation of Baltimore, Md.

A plano-convex lens 119 directs the zero-order beam toward a beam stop 120, which absorbs the zero-order beam. Furthermore, the lens 119 directs one of the first-order beams (the "reference beam") toward the shutter 106 and directs the other first-order beam (the "sample beam") toward the shutter 108. By controlling the shutters 106, 108 so that only one of these shutters is open at any given time, the detector 112 separately takes reference and sample measurements. The lens 119 is commercially available as part no. LPX 084 from Melles Griot of Irvine, Calif., and the shutters 106, 108 are each commercially available as part no. VS143SITOK from Vincent Associates of Rochester, N.Y.

Figure 3:
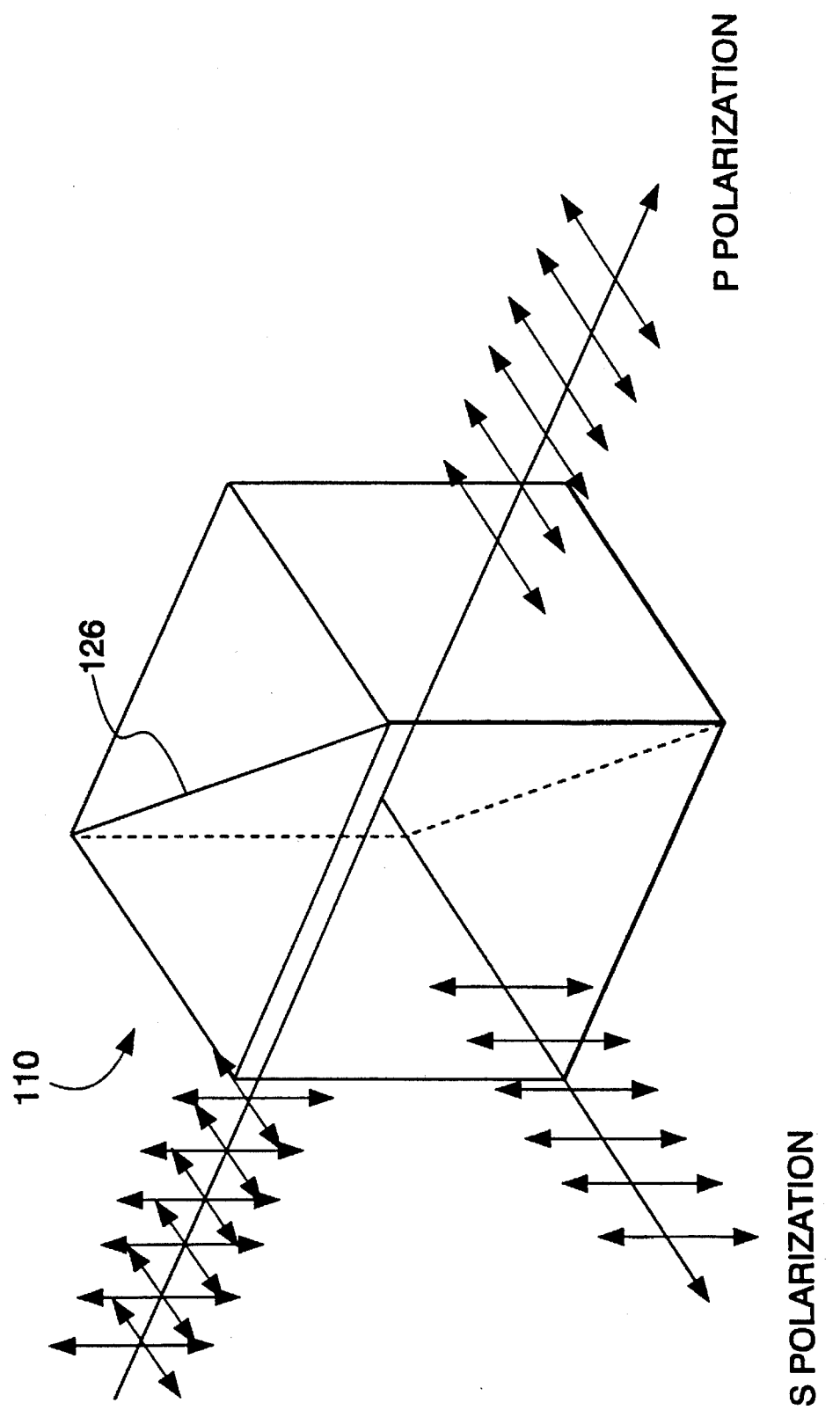
FIG. 3 is a perspective view of a polarizing beam splitter cube employed in the spectrometer in FIG. 2.

To take reference measurements, the shutter system opens the shutter 106 and closes the shutter 108. The open shutter 106 allows the reference beam to pass therethrough, while the closed shutter 108 prevents the sample beam from passing therethrough. The reference beam is focused by a converging lens 122 onto the detector 112 via a conventional mirror 124 and the polarizing beam splitter cube 110. As the mirror 124 receives the reference beam from the direction of the lens 122, the mirror 124 reflects the reference beam in the direction of the polarizing beam splitter cube 110. Referring to FIG. 3, the polarization of the reference beam is parallel to the plane of incidence of the splitter cube 110, where the plane of incidence is defined as a plane containing the direction of propagation of the reference beam striking the beam splitting face 126 and a line perpendicular to that beam splitting face 126. As defined by the beam splitting face 126, this polarization is commonly referred to as a "P" polarization. As viewed in FIG. 2, the plane of incidence is the plane of the page and the "P" polarization of the reference beam is parallel to the plane of the page.

The angled face 126 of the polarizing beam splitter 110 reflects approximately 5 to 10 percent of the incident reference beam upward (as viewed in FIG. 2) toward the detector 112, and transmits the remainder (90 to 95 percent) of the reference beam. The detector 112 detects the reflected portion of the reference beam. In one embodiment, the detector 112 is an InGaAs detector focusing on the infrared spectrum and having a built-in amplifier to minimize noise interference. Such a detector is commercially available as part no. SD 6085 from Advanced Photonics of Camarillo, Calif. In an alternative embodiment, the detector 112 does not include a built-in amplifier. Instead, since the detected radiation is relatively weak (as low as less than one percent of the first-order reference beam), a lock-in amplifier 128 coupled to the detector 112 is used to measure the detected radiation without noise interference. As is conventional, the amplifier 128 uses some form of automatic synchronization with an external reference signal, such as the RF tuning signal from the RF source 116.

The control unit 118, which is communicatively coupled to the lock-in amplifier 128, measures the amount of radiation detected by the detector 112. For typical reference readings, the shutter 106 remains open and the shutter 108 remains closed for a few seconds or less.

To take sample measurements, the shutter system simultaneously closes the shutter 106 and opens the shutter 108. In this case, the closed shutter 106 prevents any of the first-order reference beam with "P" polarization from reaching the detector 112. The first-order sample beam is focused by a converging lens 130 onto the sample via a conventional mirror 132 and the beam splitter cube 110. The converging lens 130, as well as the converging lens 122, are each commercially available as part no. LDX 069 from Melles Griot of Irvine, Calif. The mirror 132 reflects the sample beam in the direction of the polarizing beam splitter cube 110. Referring to FIG. 3, the polarization of the sample beam is orthogonal to the "P" polarization of the reference beam. Also, the polarization of the sample beam is orthogonal to the plane of incidence of the sample beam, where the plane of incidence is defined as a plane containing the direction of propagation of the sample beam striking the beam splitting face 126 and a line perpendicular to that beam splitting face 126. As defined by the beam splitting face 126, this polarization is commonly referred to as an "S" polarization. As viewed in FIG. 2, the plane of incidence is the plane of the page and the "S" polarization of the sample beam is perpendicular to the plane of the page.

The angled face 126 of the polarizing beam splitter cube 110 reflects most of the incident sample beam downward (as viewed in FIG. 2) toward the sample at an angle of 90 degrees relative to the sample. The sample specularly and diffusely reflects the incident portion of the sample beam back upward (as viewed in FIG. 2) toward the polarizing beam splitter cube 110 at the same 90 degree angle relative to the sample. The polarizing beam splitter cube 110 prevents the detector 112 from receiving the specular reflections. In particular, since any specular reflections from the sample retain, by definition, the "S" polarization, the splitter cube 110 reflects these specular reflections back out of the cube 110 along the path that the sample beam entered the cube 110. On the other hand, the randomly polarized diffuse reflections are precipitated by the targeted analyte in the sample. Instead of completely discarding these diffuse reflections, approximately 50 percent of the randomly polarized diffuse reflections are transmitted through the cube 110 toward the detector 112. The detector 112 detects these reflections transmitted through the cube 110, and the control unit 118 measures the amount of radiation detected by the detector 112. The control unit 118 compares the detected radiation from the sample with the previously measured reference value to quantitatively determine the concentration of the targeted analyte in the sample.

It should be apparent from the foregoing description that the reflectance spectrometer 100 employs both of the orthogonally-polarized first-order beams from the AOTF 104. One of these first-order beams is used as the reference beam, while the other of the first-order beams is used as the sample beam. The spectrometer 100 employs the single detector 112 for detecting portions of both the reference beam and the sample beam. Moreover, using the polarizing beam splitter cube 110, the spectrometer 100 is capable of illuminating the sample at a 90 degree angle relative to the sample and detecting the randomly-polarized diffuse reflectance from the sample at the same 90 degree angle relative to the sample. The polarizing beam splitter cube 110 also permits the spectrometer 100 to minimize the amount of specular and surface reflectance that reaches the detector 112.

While the present invention has been described with reference to one or more particular embodiments, those skilled in the art will recognize that many changes may be made thereto without departing from the spirit and scope of the present invention. For example, the shutter 18 in FIG. 1 may be relocated to a region between the splitter cube 20 and the optical fiber 38. Furthermore, although the beam splitters 20 and 22 in FIG. 1 and the polarizing beam splitter 110 in FIG. 2 are illustrated as cubic in shape, non-cubic beam splitters may also be employed. Each of these embodiments and obvious variations thereof is contemplated as falling within the spirit and scope of the claimed invention, which is set forth in the following claims.

What is claimed is:

1. A dual beam tunable spectrometer comprising:

a radiation source generating an incident radiative beam;

generating means, including an acousto-optic tunable filter, for receiving said incident radiative beam and generating therefrom a reference beam and a sample beam;

a detector for detecting at least part of said reference beam, and for detecting at least part of said sample beam emitted from a sample following illumination of the sample with said sample beam; and a shutter arrangement including a first shutter selectively permitting passage therethrough of said part of said reference beam and a second shutter selectively permitting passage therethrough of said part of said sample beam, said shutter arrangement opening said first shutter and closing said second shutter to permit said detector to detect only said part of said reference beam, said shutter arrangement closing said first shutter and opening said second shutter to permit said detector to detect only said part of said sample beam.

2. The spectrometer of claim 1, wherein said acousto-optic tunable filter processes said incident radiative beam into a zero-order beam, a first polarized first-order beam, and a second polarized first-order beam, said first first-order beam being orthogonally-polarized relative to said second first-order beam.

3. The spectrometer of claim 2, wherein said first first-order beam is said reference beam and said second first-order beam is said sample beam.

4. The spectrometer of claim 3, further including a polarizing beam splitter disposed between the sample and said detector, and further including conveying means for directing said reference beam and said sample beam into opposite sides of said polarizing beam splitter.

5. The spectrometer of claim 4, wherein said polarizing beam splitter is oriented relative to the polarizations of said reference and sample beams so as to convey said part of said reference beam toward said detector when said first shutter is open and to convey a substantial portion of said sample beam onto the sample when said second shutter is open, and wherein said polarizing beam splitter receives radiation reflected from said sample and conveys a randomly-polarized diffusely-reflected portion of said radiation to said detector when said second shutter is open.

6. The spectrometer of claim 5, wherein the polarization of said reference beam is parallel to its plane of incidence relative to said polarizing beam splitter, and wherein the polarization of said sample beam is orthogonal to its plane of incidence relative to said polarizing beam splitter.

7. The spectrometer of claim 4, wherein said conveying means includes a converging lens and a mirror.

8. The spectrometer of claim 1, further including a radio frequency source coupled to said acousto-optic tunable filter, said radio frequency source supplying said acousto-optic tunable filter with a radio frequency tuning signal to control wavelengths of said reference beam and said sample beam.

9. The spectrometer of claim 1, wherein said acousto-optic tunable filter produces a first-order beam, and wherein said generating means includes a first beam splitter for splitting said first-order beam into said reference beam and said sample beam.

10. The spectrometer of claim 9, further including a first optical fiber receiving said sample beam from said first beam splitter and conveying said sample beam to said sample, and a second optical fiber receiving radiation emitted from said sample.

11. The spectrometer of claim 10, wherein an output end of said first optical fiber and an input end of said second optical fiber are arranged on opposite sides of the sample so that said second optical fiber receives radiation transmitted through the sample.

12. The spectrometer of claim 10, wherein an output end of said first optical fiber and an input end of said second optical fiber are arranged on the same side of the sample so that said second optical fiber receives radiation reflected from the sample.

13. The spectrometer of claim 9, further including a second beam splitter disposed adjacent to said detector, said second beam splitter conveying said part of said reference beam toward said detector when said first shutter is open, said second beam splitter conveying said part of said sample beam toward said detector when said second shutter is open.

14. The spectrometer of claim 13, further including conveying means for directing said reference beam from said first beam splitter to said second beam splitter, said first shutter being disposed between said first beam splitter and said second beam splitter.

15. The spectrometer of claim 14, wherein said conveying means includes a converging lens.

16. The spectrometer of claim 13, further including first conveying means for directing said sample beam from said first beam splitter to the sample, and second conveying means for directing said part of said sample beam from the sample to said second beam splitter.

17. The spectrometer of claim 16, wherein said first conveying means includes a first converging lens and a first optical fiber, and said second conveying means includes a second converging lens and a second optical fiber.

18. The spectrometer of claim 16, wherein said second shutter is disposed between said second conveying means and said second beam splitter.

19. A dual beam tunable spectrometer comprising:
  a radiation source generating an incident radiative beam;
  an acousto-optic tunable filter receiving said incident radiative beam and generating therefrom a first-order beam;
  a first beam splitter arranged to receive said first-order beam and split said first-order beam into a reference beam and a sample beam;
  a second beam splitter arranged to receive said reference beam and convey at least part of said reference beam to a detector, said second beam splitter arranged to receive at least part of said sample beam emitted from a sample following illumination of the sample with said sample beam and to convey said part of said sample beam to said detector; and
  a shutter arrangement arranged to permit said detector to detect only one of said part of said reference beam and said part of said sample beam at any given time.

20. The spectrometer of claim 19, wherein said shutter arrangement includes a first shutter disposed between said first beam splitter and said second beam splitter to selectively permit passage therethrough of said reference beam.

21. The spectrometer of claim 20, wherein said shutter arrangement includes a second shutter disposed between the sample and said second beam splitter to selectively permit passage therethrough of said part of said sample beam, said first shutter being open and said second shutter being closed to permit said detector to detect only said part of said reference beam, said first shutter being closed and said second shutter being opened to permit said detector to detect only said part of said sample beam.

22. A dual beam tunable spectrometer comprising:
  a radiation source generating an incident radiative beam;
  an acousto-optic tunable filter receiving said incident radiative beam and generating therefrom a first-order beam;
  first conveying means for directing said incident radiative beam from said radiation source to said acousto-optic tunable filter;
  a first beam splitter arranged to receive said first-order beam and split said first-order beam into a reference beam and a sample beam;
  second conveying means for directing said first-order beam from said acousto-optic tunable filter to said first beam splitter;
  a second beam splitter arranged to receive said reference beam and convey at least part of said reference beam to a detector, said second beam splitter arranged to receive at least part of said sample beam emitted from a sample following illumination of the sample with said sample beam and to convey said part of said sample beam to said detector;
  third conveying means for directing said reference beam from said first beam splitter to said second beam splitter;
  fourth conveying means for directing said sample beam from said first beam splitter to the sample;
  fifth conveying means for directing said part of said sample beam from the sample to said second beam splitter; and
  a shutter arrangement including a first shutter disposed along said third conveying means to selectively permit passage therethrough of said reference beam, and a second shutter disposed along one of said fourth and fifth conveying means to selectively permit passage therethrough of said sample beam, said shutter arrangement opening said first shutter and closing said second shutter to permit said detector to detect only said part of said reference beam, said shutter arrangement closing said first shutter and opening said second shutter to permit said detector to detect only said part of said sample beam.

23. The spectrometer of claim 22, wherein said second shutter is disposed along said fifth conveying means.

24. A dual beam tunable reflectance spectrometer comprising:

a radiation source generating an incident radiative beam;

an acousto-optic tunable filter receiving said incident radiative beam and generating therefrom first and second orthogonally-polarized first-order beams;

a polarizing beam splitter arranged to convey at least part of said first first-order beam toward a detector and to direct at least part of said second first-order beam toward a sample at an incidence angle of approximately 90 degrees relative to the sample, said polarizing beam splitter further arranged to receive radiation reflected from the sample at a reflection angle of approximately 90 degrees relative to the sample and convey a randomly-polarized diffusely-reflected portion of the reflected radiation to said detector;

first conveying means for directing said first first-order beam from said acousto-optic tunable filter into one side of said polarizing beam splitter, and second conveying means for directing said second first-order beam from said acousto-optic tunable filter into an opposite side of said polarizing beam splitter; and first and second shutters disposed along said respective first and second conveying means to selectively permit passage therethrough of said respective first and second first-order beams, said first and second shutters being operative to permit only one of said first and second first-order beams to reach said polarizing beam splitter at a given time.

25. A method of measuring the concentration of an analyte in a sample, comprising the steps of:

generating an incident radiative beam with a radiation source;

conveying the radiative beam to an acousto-optic tunable filter;

generating a first-order beam with the acousto-optic tunable filter;

splitting the first-order beam into a reference beam and a sample beam using a first beam splitter;

conveying the reference beam from the first beam splitter to a second beam splitter;

conveying a portion of the reference beam into a detector using the second beam splitter;

cutting off conveyance of the reference beam to the second beam splitter using a shutter;

conveying the sample beam to the sample and conveying a portion of the sample beam transmitted through or reflected from the sample to the second beam splitter; and conveying the portion of the sample beam into the detector via the second beam splitter.

26. A method of measuring the concentration of an analyte in a sample, comprising the steps of:

generating an incident radiative beam with a radiation source;

conveying the radiative beam to an acousto-optic tunable filter;

generating first and second orthogonally-polarized first-order beams with the acousto-optic tunable filter, the first first-order beam corresponding to a reference beam and the second first-order beam corresponding to a sample beam;

conveying the reference beam from the acousto-optic tunable filter to a polarizing beam splitter;

conveying a portion of the reference beam into a detector using the polarizing beam splitter;

cutting off conveyance of the reference beam to the polarizing beam splitter using a shutter;

conveying the sample beam from the acousto-optic tunable filter to the polarizing beam splitter;

conveying at least part of the sample beam toward the sample at an angle of approximately 90 degrees relative to the sample; and conveying a randomly-polarized diffusely-reflected portion of the sample beam to the detector via the polarizing beam splitter.

* * * * *